(12) United States Patent
Ishida et al.

(10) Patent No.: US 7,771,129 B2
(45) Date of Patent: Aug. 10, 2010

(54) FERRULE HOLDING MEMBER FOR AN OPTICAL RECEPTACLE, METHOD OF MANUFACTURING THE SAME, AND OPTICAL RECEPTACLE USING THE SAME

(75) Inventors: Chisami Ishida, Kitakyushu (JP); Hiroshi Okumura, Kitakyushu (JP); Hirokazu Takeuchi, Otsu (JP); Masanori Wada, Otsu (JP)

(73) Assignees: Toto, Ltd., Fukuoka (JP); Nippon Electric Glass Co., Ltd., Shiga (JP)

( * ) Notice: Subject to any disclaimer, the term of this patent is extended or adjusted under 35 U.S.C. 154(b) by 373 days.

(21) Appl. No.: 11/596,368

(22) PCT Filed: Jul. 6, 2005

(86) PCT No.: PCT/JP2005/012468

§ 371 (c)(1),
(2), (4) Date: Dec. 10, 2007

(87) PCT Pub. No.: WO2006/008965

PCT Pub. Date: Jan. 26, 2006

(65) Prior Publication Data

US 2008/0193087 A1      Aug. 14, 2008

(30) Foreign Application Priority Data

Jul. 15, 2004   (JP)   ............................. 2004-208627
Jul. 4, 2005    (JP)   ............................. 2005-195179

(51) Int. Cl.
  *G02B 6/36*   (2006.01)
  *G02B 6/38*   (2006.01)
  *C03B 37/018* (2006.01)
  *C03B 37/023* (2006.01)
  *C03C 25/00*  (2006.01)

(52) U.S. Cl. ............................. 385/60; 385/78; 385/84; 65/385; 65/392

(58) Field of Classification Search .................... 385/60, 385/78, 84; 65/385, 392
See application file for complete search history.

(56) References Cited

U.S. PATENT DOCUMENTS 5,282,258 A  *  1/1994  Hoshino ....................... 385/70

(Continued)

FOREIGN PATENT DOCUMENTS

JP         62-71604         5/1987

(Continued)

OTHER PUBLICATIONS

International Search Report issued Oct. 25, 2005 in International (PCT) Application No. JP2005/012468.

*Primary Examiner*—Charlie Peng
*Assistant Examiner*—Jerry Blevins
(74) *Attorney, Agent, or Firm*—Wenderoth, Lind & Ponack, L.L.P.

(57) ABSTRACT

Provided is a ferrule holding member with a transparent body attached to an inner hole of a sleeve. The transparent body has a primary end face for bringing into contact with an end face of a plug ferrule at a halfway position in an axial direction of the sleeve. The primary end face of the transparent body has a convex curved surface obtained through heat treatment. The convex curved surface is preferably an unpolished surface, and a region with a radius of 75 μm or more, centered around a shaft axis of the sleeve at the convex curved surface, has a convex spherical surface. Alternatively, the transparent body is directly fixed to an inner surface of the sleeve through heat treatment.

24 Claims, 6 Drawing Sheets

U.S. PATENT DOCUMENTS

| | | | |
|---|---|---|---|
| 5,295,213 A * | 3/1994 | Ueda et al. | 385/78 |
| 5,615,291 A * | 3/1997 | Hayakawa et al. | 385/84 |
| 5,937,122 A | 8/1999 | Ohki et al. | |
| 6,311,010 B1 * | 10/2001 | Medeiros | 385/140 |
| 6,501,900 B1 * | 12/2002 | Aloisio, Jr. et al. | 385/140 |
| 6,659,659 B1 * | 12/2003 | Malone | 385/94 |
| 7,210,857 B2 * | 5/2007 | Blasingame | 385/88 |
| 2002/0114585 A1 * | 8/2002 | Nishita | 385/81 |
| 2002/0181890 A1 * | 12/2002 | Perko et al. | 385/78 |
| 2003/0128937 A1 * | 7/2003 | Sato et al. | 385/78 |
| 2005/0196105 A1 * | 9/2005 | Liu | 385/78 |
| 2005/0220401 A1 * | 10/2005 | Jiang et al. | 385/28 |

FOREIGN PATENT DOCUMENTS

| | | |
|---|---|---|
| JP | 04-223412 | 8/1992 |
| JP | 08-122578 | 5/1996 |
| JP | 09-080269 | 3/1997 |
| JP | 0 826 998 | 3/1998 |
| JP | 10-68843 | 3/1998 |
| JP | 10-148736 | 6/1998 |
| JP | 10-332988 | 12/1998 |
| JP | 2003-270495 | 9/2003 |

* cited by examiner

FERRULE HOLDING MEMBER FOR AN OPTICAL RECEPTACLE, METHOD OF MANUFACTURING THE SAME, AND OPTICAL RECEPTACLE USING THE SAME

TECHNICAL FIELD

The present invention relates to a ferrule holding member for an optical receptacle used for, for example, optically connecting an optical fiber connector to a light receiving/light emitting device, to a method of manufacturing the same, and to an optical receptacle using the same. The present invention more specifically relates to a ferrule holding member for an inexpensive stubless optical receptacle, and to a related technology thereof.

BACKGROUND ART

As is well known, a conventional optical receptacle is constructed as disclosed in Patent Document 1, for example, by: inserting a cylindrical embedded ferrule into a base end portion of an inner hole of a sleeve through press-fitting or bonding; and fitting a sleeve holder around an outer periphery of a base end portion of the sleeve. Then, a ferrule (plug ferrule) is inserted into a tip side of the inner hole of the sleeve, and an optical fiber on the plug ferrule side and an optical fiber on the embedded ferrule side are brought into contact with each other at respective end faces for optical connection.

Another known conventional optical receptacle, which is different from the optical receptacle described above, is constructed as disclosed in Patent Document 2, for example, by: inserting a rod formed of an optical material such as glass into a base end portion of an inner hole formed in a main body of a semiconductor module; and bringing into contact with each other a tip face of the rod, and an end face of the ferrule inserted into a tip side of the inner hole. The tip face (B face in Patent Document 2) of the rod brought into contact with the end face of the ferrule is subjected to spherical polishing. This rod may be regarded as being inserted into the inner hole of the module main body through press-fitting or bonding in consideration of the fact that the tip face of the rod is subjected to spherical polishing and an operation of fixing the rod must be performed while the tip face subjected to spherical polishing is protected.

Patent Document 1: JP-A-10-332988 (FIG. 4)
Patent Document 2: JP-A-04-223412

DISCLOSURE OF THE INVENTION

Problems to be Solved by the Invention

The optical receptacle disclosed in Patent Document 1 employs an embedded ferrule, and thus is connected to a plug ferrule through physical contact (PC) connection. In order to suppress an insertion loss to minimum, the outer diameter, inner diameter, and concentricity therebetween of the embedded ferrule must be finished to high accuracy. Accuracy of submicron order is required, and the embedded ferrule has an outer diameter of 1.249 mm±0.5 μm, an inner diameter of 126.5 μm±0.5 μm (in use of an optical fiber having a diameter of 125 μm), and a concentricity between the outer diameter and the inner diameter of 1.4 μm or less. The accuracy of submicron order has currently caused a soaring production cost. Note that, physical contact connection (PC connection) refers to a connecting method involving: forming a ferrule end face of an optical fiber connector into a shape of a convex spherical surface through polishing or the like; and attaching a core portion of the optical fiber to the ferrule end face to reduce Fresnel reflection.

The optical fiber inserted into the inner hole of the embedded ferrule must be fixed with an adhesive. However, an operation of fixing the optical fiber with an adhesive must be performed manually, and thus requires much labor and cost. A difference between the outer diameter of the optical fiber and the inner diameter of the embedded ferrule, that is, a clearance is 1 to 2 μm (maximum eccentricity of 1.0 μm). The optical fiber decenters in the inner hole of the embedded ferrule, and the maximum concentricity between the outer diameter and the inner diameter of the embedded ferrule is 1.4 μm (maximum eccentricity of 0.7 μm). Thus, an optical receptacle having an insertion loss exceeding a tolerance of 0.5 dB is inevitably manufactured.

Here, the insertion loss is calculated from the eccentricity theoretically as described below. That is, a relationship between the eccentricity and the insertion loss is represented by the following equation. Insertion loss $(dB)=4.34 \times L/(D/2)^2$. Note that, L represents a distance (distance between core portions) between a center of a core portion of an optical fiber attached to a plug ferrule, and a center of a core portion of an optical fiber attached to an embedded ferrule. D represents a mode field diameter.

As described above, the maximum eccentricity of the optical fiber in the inner hole is 1 μm for each of the plug ferrule and the embedded ferrule. Further, the maximum eccentricity obtained from the concentricity between the outer diameter and the inner diameter of the ferrule is 0.7 μm, to thereby provide a total maximum eccentricity of 1.7 μm. Thus, a maximum distance between the core portions is theoretically 3.4 μm, and a mode field diameter is presumably 10 μm, to thereby provide a large insertion loss of 2.0 dB at maximum.

In this case, a tolerance for an insertion loss of an optical communication receptacle is 0.5 dB, and dimensional accuracy of the embedded ferrule must be improved in consideration of the tolerance. Thus, the improvement in dimensional accuracy is an inevitable factor for cost increase. Further, depending on environmental changes, the optical fiber may project or retract from the end face of the embedded ferrule. Thus, the insertion loss is liable to increase, to thereby possibly inhibit PC connection.

The end face of the embedded ferrule brought into contact with the plug ferrule must be polished with high accuracy into a convex spherical surface allowing PC connection. However, the operation allows polishing of only one or a few embedded ferrules at one time, thus has low mass productivity. Low mass productivity is another factor causing increase in production cost. In addition, the optical receptacle has a problem in that the end face of the embedded ferrule is liable to be scratched through polishing, to thereby reduce a return loss. The optical receptacle disclosed in Patent Document 2 may have the same problems in consideration of the fact that the tip face of the rod inserted into the inner hole of the module main body must be subjected to spherical polishing.

The embedded ferrule is fixed through press-fitting or bonding with an adhesive at a base end portion of a rigid sleeve. A bonding position of the embedded ferrule fixed through press-fitting may change owing to variation in air temperature. Meanwhile, in the embedded ferrule fixed through bonding with an adhesive, the adhesive is liable to degrade in a high temperature and high humidity environment, and a bonding position of the embedded ferrule may change. Change in bonding position of the embedded ferrule results in change in distance between the light emitting element or light receiving element and the embedded ferrule, and a coupling efficiency may be reduced. The optical receptacle disclosed in Patent Document 2 may have the same problems in consideration of the fact that the rod must be fixed in the inner hole of the module main body through press-fitting or bonding with an adhesive.

A first technical object of the present invention is to provide: a ferrule holding member for an optical receptacle which can be manufactured at low cost, which has a small insertion loss, and which has a convex curved surface connected to an end face of the ferrule on a tip side formed easily to have appropriate shape and properties; a method of manufacturing the same; and an optical receptacle using the same.

A second technical object of the present invention is to provide: a ferrule holding member for an optical receptacle which can be manufactured at low cost, which has a small insertion loss, which causes no reduction in coupling efficiency; a method of manufacturing the same; and an optical receptacle using the same.

Means for Solving the Problems

A ferrule holding member for an optical receptacle according to the present invention for attaining the above-described first technical object, including: a sleeve having an inner hole for inserting a ferrule; and a transparent body provided in the inner hole of the sleeve and having a primary end face for bringing into contact with an end face of the ferrule at a halfway position in an axial direction of the sleeve, is characterized in that the primary end face of the transparent body has a convex curved surface obtained through heat treatment. In this case, the transparent body has the primary end face at a halfway position in an axial direction of the sleeve, preferably at a center position in the axial direction of the sleeve for delivery of light between a ferrule (plug ferrule) and an optical element (light emitting element or light receiving element). The transparent body is preferably a cylindrical body formed of a single solid member.

According to the above-described construction, the ferrule holding member for an optical receptacle includes the sleeve and the transparent body, and the primary end face of the transparent body brought into contact with the end face of the ferrule (plug ferrule) has a convex curved surface obtained through heat treatment. Thus, the ferrule holding member for an optical receptacle can be manufactured at low cost and has a small insertion loss. That is, the transparent body serves to deliver light between the plug ferrule and the light receiving element or light emitting element, similar to an embedded ferrule. Further, the transparent body requires no optical fiber, and thus requires no labor, burden, or cost for inserting and bonding the optical fiber. The transparent body has no waveguide structure such as an optical fiber, which the embedded ferrule has, and thus causes no axis shift with a core of the optical fiber of the opposing plug ferrule. The transparent body only needs to be PC connected, and has no insertion loss due to eccentricity. The insertion loss depends only on surface quality of a PC connection surface and light transmittance of the transparent body at a communication wavelength, and never exceeds 0.5 dB. Further, the primary end face of the transparent body is softened and deformed through heat treatment and then solidifies. Thus, the primary end face has a convex curved surface of an appropriated shape by virtue of surface tension or the like, and the primary end face has a convex curved surface with properties of a mirror surface or mirror-like surface. Even if a precursor of the transparent body lacks dimensional accuracy, the precursor of the transparent body may be softened and deformed through heat treatment, to thereby provide a primary end face having a convex curved surface of an appropriate shape. Thus, the precursor of the transparent body has a wide tolerance range of dimensional accuracy and improved yield, thereby allowing manufacture of the precursor of the transparent body at low cost. The primary end face of the transparent body is formed through heat treatment. Thus, even if contaminants such as an organic substance adhere to a surface of the precursor of the transparent body, the surface is subjected to heat cleaning, to thereby suppress optical loss due to the contaminants or the like.

In the above-described construction, the primary end face of the transparent body is preferably an unpolished surface.

In this way, the primary end face of the transparent body has a mirror surface or mirror-like surface obtained through heat treatment. Thus, a polishing step, which may be a factor for cost increase, can be omitted, and the end face is hardly scratched through polishing. Not only reduction in return loss may be suppressed, but also the primary end face may have better optical properties than those of a polished surface.

In the above-described construction, a region with a radius of 75 μm or more centered around a shaft axis of the sleeve at the primary end face of the transparent body preferably has a convex spherical surface. In this case, the convex spherical surface needs not to be a convex spherical surface having a single radius of curvature across the entire region and may be a surface formed of smooth continuous convex spherical surfaces having different radii of curvature.

In this way, the region with a radius of 75 μm or more centered around a shaft axis of the sleeve has a convex spherical surface, to thereby stably realize PC connection between the primary end face of the transparent body and the end face of the ferrule (plug ferrule).

In the above-described construction, a radius of curvature $\rho$ of the convex spherical surface and an inner diameter d of the sleeve preferably satisfy a relationship of $\rho > d/2$.

Such a relationship together with the convex spherical surface set as described above facilitates PC connection.

In the above-described construction, the convex spherical surface has a radius of curvature $\rho$ of preferably 3 to 50 mm.

In this way, in PC connection of the primary end face of the transparent body and the end face of the ferrule, stress is hardly focused at the tip portion of the optical fiber on a ferrule side, and probability of troubles involving scratching of the tip portion and inhibition of light passage decreases. That is, in PC connection, if the convex spherical surface has a radius of curvature of less than 3 mm, stress is liable to be focused at the tip portion of the optical fiber on the ferrule side. If the convex spherical surface has a radius of curvature of more than 50 mm, return light becomes strong, which may inhibit PC connection. Such troubles are efficiently avoided if the radius of curvature $\rho$ falls within the above numerical ranges. A preferable range of the radius of curvature $\rho$ of the convex spherical surface is 7 to 25 mm.

A ferrule holding member for an optical receptacle according to the present invention for attaining the above-described second technical object, including: a sleeve having an inner hole for inserting a ferrule; and a transparent body provided in the inner hole of the sleeve and having a primary end face for bringing into contact with an end face of the ferrule at a halfway position in an axial direction of the sleeve, is characterized in that the transparent body is directly fixed to an inner surface of the sleeve through heat treatment.

According to the above-described construction, the ferrule holding member for an optical receptacle includes the sleeve and the transparent body, and has the transparent body directly and thermally fixed to the inner surface of the sleeve. Thus, the ferrule holding member for an optical receptacle can be manufactured at low cost, has a small insertion loss, and has hardly reduced coupling efficiency. Further, the transparent body has no optical fiber attached, and thus has advantages involved in the fact that no optical fiber is attached as described above. Even if a precursor of the transparent body lacks dimensional accuracy, the precursor of the transparent body may be softened and deformed through heat treatment, to thereby thermally fix the transparent body to the inner surface of the sleeve. Thus, the precursor of the transparent body has a wide tolerance range of dimensional accuracy and improved yield, thereby allowing manufacture of the precursor of the transparent body at low cost. The transparent body is thermally bonded to the inner surface of the sleeve. Thus, a bonding position of the transparent body does not change even when the transparent body is exposed to variation in air temperature or to a high temperature and high humidity environment, thereby inhibiting reduction in coupling efficiency.

In the above-described construction, a fixing strength between the sleeve and the transparent body is preferably 49 N or more.

In this way, the fixing strength thereof is 49 N or more, to thereby avoid loosening of the transparent body and improve durability of the optical receptacle.

In the above-described construction, a fixing strength between the sleeve and the transparent body is preferably 49 N or more after the ferrule holding member for an optical receptacle is left standing in a high temperature and high humidity environment of 85° C. and 85% RH for 2,000 hours.

In this way, properties of the optical receptacle hardly change in any environment, and probability of adverse effects due to the environment significantly reduces.

In the above-described construction, the transparent body and the sleeve are preferably hermetically sealed.

In this way, a space formed between the optical receptacle and a light receiving/emitting element in an optical module may be maintained hermetically, to be specific, highly hermetically at $1 \times 10^{-9}$ Pa·m$^3$/sec or less.

In the above-described construction, the heat treatment is preferably performed by means of arc discharge, laser, flame, or indirect heating with a heat treatment furnace or the like.

The term "heat treatment" as used herein includes heat treatment for forming a convex curved surface on the primary end face of the transparent body and heat treatment for fixing the transparent body to the inner surface of the sleeve. The heat treatments are preferably performed at the same time. $CO_2$ laser (wavelength of 10 μm) may be used as laser, and an electric furnace may be used as a heat treatment furnace.

In the above-described construction, the ferrule holding member for an optical receptacle satisfies an expression of $-10 \Log \{(nf-nb)^2/(nf+nb)^2\} \geq 37$, in which nb represents a refractive index of the transparent body and nf represents a refractive index of a core portion of the optical fiber attached to the inner hole of the ferrule.

In this way, $-10 \Log \{(nf-nb)^2/(nf+nb)^2\}$ is 37 or more, to thereby suppress return light and avoid adverse effects on optical properties. In this case, $-10 \Log \{(nf-nb)^2/(nf+nb)^2\}$ is more preferably 40 or more.

In the above-described construction, a difference in average thermal expansion coefficient between the sleeve and the transparent body is preferably 8 ppm/° C. or less at 30 to 380° C.

In this way, the difference in average thermal expansion coefficient between the sleeve and the transparent body does not increase excessively under operating temperature conditions, to thereby preferably prevent formation of cracks in the sleeve or the transparent body.

In the above-described constitution, a difference in average thermal expansion coefficient between the sleeve and the transparent body is preferably 1 ppm/° C. or less at 30 to 380° C.

In this way, the difference in average thermal expansion coefficient between the sleeve and the transparent body under operating temperature conditions is a more appropriate value, to thereby suppress tension in the transparent body. Thus, polarization dependent loss (PDL) or polarization mode dispersion (PMD) hardly increases.

In the above-described constitution, the transparent body with a thickness of 1 mm preferably has a light transmittance of 85% or more in an infrared region of a wavelength of 800 to 1,700 nm.

In this way, the transparent body advantageously transmits light of an optical communication wavelength and is preferably used for optical communication.

In the above-described constitution, at least one of the transparent body and the sleeve each with a thickness of 1 mm partly or entirely has a light transmittance of 75% or more in an ultraviolet region of a wavelength of 300 to 450 nm.

In this way, at least one of the transparent body and sleeve advantageously transmits ultraviolet light and is preferably used for, for example, a case where an isolator chip is fixed to an end face of a transparent body by using a UV-curable adhesive.

In the above-described constitution, the transparent body is preferably formed of glass.

In this way, the transparent body formed of glass has an advantage of excellent weatherability.

In the above-described constitution, the transparent body is preferably formed of borosilicate glass.

In this way, the transparent body formed of borosilicate glass has advantages in that it has a similar or the same thermal expansion coefficient to or as that of a sleeve material, a small difference in refractive index with that of the core portion of the optical fiber, and excellent weatherability.

In the above-described constitution, to be specific, the borosilicate glass preferably contains 65 to 85% $SiO_2$, 8 to 25% $B_2O_3$, 1.5 to 10% $Li_2O+Na_2O+K_2O$, 0 to 10% $Al_2O_3$, and 0 to 5% $MgO+CaO+SrO+BaO+ZnO$ in mass %. The borosilicate glass particularly preferably contains 67 to 80% $SiO_2$, 12 to 19% $B_2O_3$, 2 to 9.5% $Li_2O+Na_2O+K_2O$, 0 to 6% $Al_2O_3$, 0 to 3% $MgO+CaO+SrO+BaO+ZnO$, and 0 to 0.05% $Fe_2O_3$ in mass %.

The borosilicate glass may further contain small amounts of PbO, $ZrO_2$, $TiO_2$, $As_2O_3$, $Sb_2O_3$, $Cl_2$, and the like, in addition to the above-described components.

In this way, the transparent body formed of borosilicate glass may more appropriately have the above-described advantages.

In the above-described constitution, the transparent body preferably has a flat surface inclined with respect to a plane perpendicular to an axis of the sleeve, the flat surface being formed on a secondary end face opposite to the primary end face.

In this way, return light at the secondary end face of the transparent body may be cut, to thereby efficiently avoid optically adverse effects due to return light. In particular, a transparent body having a flat surface at an angle of 4 to 15° with respect to a plane perpendicular to an axis of a sleeve has the above-described advantages provided by forming a flat surface inclined with respect to a plane perpendicular to the axis of the sleeve on a secondary end face opposite to the primary end face, and an advantage of maintaining a high coupling efficiency.

In the above-described construction, the sleeve is preferably formed of ceramics, crystallized glass, a metal, or a resin.

In this way, the sleeve appropriately serves as a sleeve covering an outer periphery of the transparent body. In particular, the sleeve formed of ceramics or crystallized glass has high thermal resistance, to thereby provide advantages in that the sleeve has no varying dimensions, no degradation, and excellent weatherability when a base material of the transparent body is softened and deformed.

In the above-described construction, the sleeve preferably has a slit formed thereon. In this case, the slit is preferably formed so as to extend parallel with a direction along the core axis of the sleeve.

In this way, stress can be released even if the difference in average thermal expansion between the sleeve and the transparent body is large, to thereby prevent formation of cracks in the sleeve or the transparent body.

The above-described first and second technical objects may be attained with the optical receptacle formed by using the ferrule holding member for an optical receptacle having the above-described construction.

Meanwhile, a method of manufacturing a ferrule holding member for an optical receptacle according to the present invention for attaining the first technical object, which includes: a sleeve having an inner hole for inserting a ferrule; and a transparent body provided in the inner hole of the sleeve and having a primary end face for bringing into contact with an end face of the ferrule at a halfway position in an axial direction of the sleeve, is characterized by including the step of forming the primary end face of the transparent body into a convex curved surface by: inserting a precursor of the transparent body into the inner hole of the sleeve; and softening the precursor of the transparent body by means of heat treatment.

According to the above-described method, the precursor of the transparent body is inserted into the inner hole of the sleeve, and the precursor of the transparent body is softened by means of heat treatment, to thereby from the primary end face of the transparent body brought into contact with the end face of the ferrule (plug ferrule) into a convex curved surface by surface tension or the like. Thus, low production cost and reduction in insertion loss are realized. Further, the primary end face of the transparent body is softened and deformed by means of heat treatment and then solidifies, and thus has a convex curved surface with properties of a mirror surface or mirror-like surface. Even if the precursor of the transparent body lacks dimensional accuracy, the precursor of the transparent body may be softened and deformed through heat treatment, to thereby provide a primary end face having a convex curved surface of an appropriate shape. Thus, the precursor of the transparent body has a wide tolerance range of dimensional accuracy and improved yield, thereby allowing manufacture of the precursor of the transparent body at low cost. The primary end face of the transparent body is formed through heat treatment. Thus, even if contaminants such as an organic substance adhere to a surface of the precursor of the transparent body, the surface is subjected to heat cleaning, to thereby efficiently remove the contaminants which increase optical loss.

A method of manufacturing a ferrule holding member for an optical receptacle according to the present invention for attaining the above-described second technical object, which includes: a sleeve having an inner hole for inserting a ferrule; and a transparent body provided in the inner hole of the sleeve and having a primary end face for bringing into contact with an end face of the ferrule at a halfway position in an axial direction of the sleeve, is characterized by including the step of fixing the transparent body and the sleeve by: inserting a precursor of the transparent body into the inner hole of the sleeve; and softening the precursor of the transparent body by means of heat treatment.

According to the above-described method, the precursor of the transparent body is inserted into the inner hole of the sleeve, and the precursor of the transparent body is softened by means of heat treatment, to thereby directly and thermally fix the transparent body to the inner surface of the sleeve. Thus, low production cost and reduction in insertion loss are realized. Even if the precursor of the transparent body lacks dimensional accuracy, the precursor of the transparent body may be softened and deformed, to thereby thermally fix the transparent body to the inner surface of the sleeve. Thus, the precursor of the transparent body has a wide tolerance range of dimensional accuracy and improved yield, thereby allowing manufacture of the precursor of the transparent body at low cost. Further, the transparent body is thermally bonded to the inner surface of the sleeve. Thus, a bonding position of the transparent body does not change even when the transparent body is exposed to variation in air temperature or to a high temperature and high humidity environment, thereby inhibiting reduction in coupling efficiency.

In any of the above-described methods, the heat treatment is preferably performed by means of arc discharge, laser, flame, or indirect heating with a heat treatment furnace or the like.

In this way, the precursor of the transparent body may be easily softened and deformed, to thereby form a primary end face of the transparent body having an appropriate convex curved surface by surface tension or the like. In particular, the precursor of the transparent body may be easily softened and deformed by means of laser or indirect heating (such as a heat treatment furnace), to thereby reduce shift (eccentricity) between a top of the convex curved surface (convex spherical surface) and a center of an inner diameter of the sleeve. The indirect heating involves heating of the entire sleeve including the precursor of the transparent body in the inner hole by using a heat treatment furnace. A heat treatment temperature at this time has only to be lower than the softening point or melting point of the sleeve and higher than the softening point of a glass rod. To be specific, the heat treatment temperature is 500 to 800° C., and preferably 600 to 800° C. for obtaining a convex spherical surface having a desired radius of curvature in a short period of time and performing heat cleaning of the end face of the transparent body at the same time. In this case, a heat treatment time of 3 hours or less provides an advantage of excellent production efficiency. The heating by means of $CO_2$ laser as laser allows softening of the precursor of the transparent body in a short period of time.

In any of the above-described methods, the precursor of the transparent body is preferably a glass rod or a resin rod.

In this way, the precursor of the transparent body may be easily and assuredly softened and solidified into a transparent body having a primary end face of a convex curved surface, or may be easily and assuredly fixed thermally to the inner surface of the sleeve as a transparent body. In this case, the glass rod preferably contains 65 to 85% $SiO_2$, 8 to 25% $B_2O_3$, 1.5 to 10% $Li_2O+Na_2O+K_2O$, 0 to 10% $Al_2O_3$, and 0 to 5% $MgO+CaO+SrO+BaO+ZnO$ in mass % from view points of refractive index, thermal expansion coefficient, devitrification resistance during softening and deformation, and the like. Further, a resin rod may also be used, and specific examples thereof include thermoplastic resins such as a polycarbonate resin, a polyethylene resin, a polypropylene resin, an acrylic resin, and a fluorine resin.

In any of the above-described methods, an end face of the glass rod or the resin rod is preferably beveled.

In this way, the beveled end face provides advantages in that: the end face of the rod is not chipped; the convex spherical surface is hardly distorted; and a climbing phenomenon at an interface between the transparent body and the sleeve hardly occurs.

Effects of the Invention

As described above, the ferrule holding member for an optical receptacle, method of manufacturing the same, and optical receptacle using the same according to the present invention allow the following. The primary end face of the transparent body inserted into the inner hole of the sleeve is formed into a convex curved surface through heat treatment. Thus, the primary end face may have a convex curved surface with properties of a mirror surface or mirror-like surface, and low production cost and reduction in insertion loss may be realized. Further, even if contaminants such as an organic substance adhere to a surface of the precursor of the transparent body, the primary end face of the transparent body is subjected to heat cleaning into a clean surface, to thereby suppress optical loss due to the contaminants or the like.

Further, the ferrule holding member for an optical receptacle, method of manufacturing the same, and optical receptacle using the same according to the present invention allow the following. The transparent body inserted into the inner hole of the sleeve is directly fixed to the inner surface of the sleeve through heat treatment. Thus, the transparent body and the sleeve are strongly fixed, and low production cost and reduction in insertion loss are realized. Further, the precursor of the transparent body may have a wide tolerance range of dimensional accuracy. Thus, a bonding position of the transparent body does not change even when the transparent body is exposed to variation in air temperature or to a high temperature and high humidity environment, thereby suppressing reduction in coupling efficiency as much as possible.

BEST MODE FOR CARRYING OUT THE INVENTION

Hereinafter, embodiments of the present invention will be described by referring to attached drawings. FIG. 1 is a longitudinal sectional front view showing an optical receptacle having attached thereto a ferrule holding member for an optical receptacle (hereinafter, simply referred to as a ferrule holding member) according to an embodiment of the present invention. FIG. 2 is an enlarged longitudinal sectional front view showing a state of a plug ferrule inserted into the ferrule holding member according to the embodiment of the present invention.

As shown in FIG. 1, an optical receptacle 1 has a ferrule holding member 3 attached inside a holder 2 having a collar portion 2a at an end of a base end side of the optical receptacle 1. The ferrule holding member 3 includes as structural members: a cylindrical sleeve 4 fixed inside an insertion hole of the holder 2; and a cylindrical solid transparent body 5 fixed thermally to an inner surface of the sleeve 4 on a base end side. In this case, a primary end face 5a on a tip side of the transparent body 5 is positioned halfway in an axial direction (nearly center portion in an axial direction) of the sleeve 4.

As shown in FIGS. 1 and 2, the primary end face 5a of the transparent body 5 has a convex curved surface obtained through heat treatment which is an unpolished surface. A region with a radius of 75 μm or more centered around a shaft axis Z of the sleeve 4 has a convex spherical surface. A radius of curvature ρ of the convex spherical surface and an inner diameter d of the sleeve 4 satisfy a relationship of ρ>d/2. To be specific, the radius of curvature ρ of the convex spherical surface is set to 3 to 50 mm. An end face 6a of a plug ferrule 6 inserted from a tip side of the sleeve 4 is formed so as to bring into contact with the convex spherical surface at the primary end face 5a of the transparent body 5. In this case, an optical fiber 7 attached to the inner hole of the plug ferrule 6 has a core portion 7a with a diameter of about 10 μm and an outer peripheral clad portion 7b with a diameter of about 125 μm. The convex spherical surface of the primary end face 5a of the transparent body 5 is formed so as to bring into contact with the core portion 7a of the optical fiber 7.

The transparent body 5 is directly fixed to an inner surface of the sleeve 4 through heat treatment, and a fixing strength between the sleeve 4 and the transparent body 5 is 49 N or more. To be specific, the transparent body 5 is fixed at a fixing strength of 49 N or more after the ferrule holding member is left standing in a high temperature and high humidity environment of 85° C. and 85% RH for 2,000 hours. Further, the transparent body 5 and the sleeve 4 are hermetically sealed. In this case, means of heat treatment for fixing the transparent body 5 to the inner surface of the sleeve 4 and means of heat treatment for forming the primary end face 5a of the transparent body 5 into a convex curved surface each involve means of arc discharge, laser, flame, or indirect heating with a heat treatment furnace or the like. Note that, $CO_2$ laser (wavelength of 10 μm) may be used as laser, and an electric furnace may be used as a heat treatment furnace for indirect heating.

A refractive index (nb) of the transparent body 5 and a refractive index (nf) of the core portion 7a of the optical fiber 7 attached to the inner hole of the plug ferrule 6 satisfy an expression of $-10 \log \{(nf-nb)^2/(nf+nb)^2\} \geqq 37$. A difference in average thermal expansion coefficient between the sleeve 4 and the transparent body 5 is 8 ppm/° C. or less, preferably 1 ppm/° C. or less at 30 to 380° C. The transparent body 5 with a thickness of 1 mm has a light transmittance of 85% or more in an infrared region of a wavelength of 800 to 1,700 nm. At least one of the transparent body 5 and the sleeve 4 each with a thickness of 1 mm partly or entirely (the entirety of the transparent body 5 alone in this embodiment) has a light transmittance of 75% or more in an ultraviolet region of a wavelength of 300 to 450 nm. The transparent body 5 is formed of glass or a resin, and preferably borosilicate glass. The borosilicate glass preferably contains 65 to 85% $SiO_2$, 8 to 25% $B_2O_3$, 1.5 to 10% $Li_2O+Na_2O+K_2O$, 0 to 10% $Al_2O_3$, and 0 to 5% $MgO+CaO+SrO+BaO+ZnO$ in mass %, particularly preferably contains 67 to 80% $SiO_2$, 12 to 19% $B_2O_3$, 2 to 9.5% $Li_2O+Na_2O+K_2O$, 0 to 6% $Al_2O_3$, 0 to 3% $MgO+CaO+SrO+BaO+ZnO$, and 0 to 0.05% $Fe_2O_3$ in mass %.

Meanwhile, the sleeve 4 is a cylindrical single member and may be formed of ceramics, crystallized glass, a metal, or a resin. However, in this embodiment, the sleeve 4 is formed of ceramics (zirconia) or crystallized glass ($Li_2O$—$Al_2O_3$—$SiO_2$-based crystallized glass which precipitates a solid solution of β-Spodumene as a main crystal phase). In particular, the sleeve 4 formed of $Li_2O$—$Al_2O_3$—$SiO_2$-based crystallized glass which precipitates a solid solution of β-Spodumene as a main crystal phase can be manufactured through heating, stretching, and molding. Thus, inner and outer diameters of the sleeve have very high dimensional accuracy, to thereby facilitate insertion of the plug ferrule, and facilitate holding of the plug ferrule by inhibiting loosening of the plug ferrule.

A secondary end face 5b on an opposite side (base end side) to the primary end face 5a of the transparent body 5 has a flat surface at an angle α of 4 to 15° with respect to a plane 8 perpendicular to the axis of the sleeve 4 (plane perpendicular to a shaft axis Z). An end face 4b on a base end side of the sleeve 4 also has a flat surface at the same angle of inclination a as that of the secondary end face 5b in the same plane.

FIG. 3 is a longitudinal sectional front view of an optical receptacle having attached thereto a ferrule holding member according to another embodiment of the present invention. As shown in FIG. 3, an optical receptacle 21 has a ferrule holding member 23 attached inside a holder 22 having a collar portion 22a. The ferrule holding member 23 is formed of an insulating material of ceramics, crystallized glass, glass, or a resin. The ferrule holding member 23 includes as structural members: a thick cylindrical sleeve 24 fixed inside an insertion hole of the holder 22; and the cylindrical solid transparent body 5 fixed thermally to an inner surface of the sleeve 24 on a base end side. The sleeve 24 is fixed to the holder 22 at a base end portion alone through press-fitting or bonding, and the holder 22 has a shape which does not cover a tip portion of the sleeve 24. The sleeve 24 has a larger thickness than that of the sleeve 4 used in the optical receptacle 1 shown in FIG. 1. The sleeve 24 has excellent mechanical strength and is hardly broken even if the tip portion is not covered by the holder 22. The optical receptacle 21 having such a structure inhibits the tip portion from serving as an antenna to transmit or receive electromagnetic waves (because the tip portion of the sleeve 24 is not covered by the holder 22), and hardly provides adverse effects on transmitter-receiver electronic components (such as laser diode) each having an optical receptacle attached.

The ferrule holding members 3 and 23 having the respective structures as described above are manufactured through the following method.

First, as shown by reference symbol A of FIG. 4, a glass material is subjected to drawing to manufacture a long original glass rod 9. As shown by reference symbol B of FIG. 4, a plurality of manufactured original glass rods 9 are bundled and cut into a predetermined length in an axial direction, and both end faces are roughly polished. Thus, as shown by reference symbol C of FIG. 4, a plurality of glass rods 10 are obtained at once as a precursor of a transparent body. Then, as shown by reference symbol D of FIG. 4, both end faces 11a of each of the glass rods are subjected to beveling 11b. As shown by reference symbol E of FIG. 4, the beveled glass rod 11 is inserted into an inner hole of the cylindrical sleeve 4 formed of ceramics (zirconia) or crystallized glass ($Li_2O$—$Al_2O_3$—$SiO_2$-based crystallized glass which precipitates a solid solution of β-Spodumene as a main crystal phase).

Then, the end face 4a of the sleeve 4 on a base end side and an end face 11a of the glass rod 11 on a base end side are aligned to form an assembled body 12. The assembled body 12 is placed in an electric furnace, or the glass rod 11 is irradiated with a laser beam from a tip opening portion 4c of the sleeve 4, to thereby soften and deform the glass rod 11. In this way, the end face (primary end face) 11a of the glass rod 11 on a tip side is formed into a convex curved surface by surface tension, and the glass rod 11 is thermally fixed to an inner surface of the sleeve 4. Then, an end portion of the assembled body 12 on a base end side is polished to form an inclined flat surface, to thereby provide the ferrule holding member 3 as described above. The above-described manufacturing method can be performed in the same manner for the case where an original resin rod formed of a long resin material is used as a starting material.

EXAMPLES

The ferrule holding member for an optical receptacle of the present invention will be described in more detail based on examples. In examples of the present invention, different glass rods 11 and sleeves 4 were used. Further, different heat treatments were performed, and the ferrule holding members were each subjected to various evaluations. The results are shown below. Note that, Table 1 shows the results of Examples 1 to 4 each using an electric furnace, and Table 2 shows the results of Examples 5 and 6 each using $CO_2$ gas laser.

<Glass Rod A>

Borosilicate glass (composition: 70% $SiO_2$, 6% $Al_2O_3$, 13% $B_2O_3$, 1% CaO, 2% BaO, 6.5% $Na_2O$, 1% $K_2O$, and 0.5% $Sb_2O_3$ in mass %; thermal expansion coefficient: 5.1 ppm/° C.; refractive index (1,310 nm): 1.471; refractive index (1,550 nm): 1.469; beveled; cylinder of 2 mm in height×1.248 mmΦ in outer diameter)

<Glass Rod B>

Borosilicate glass (composition: 80% $SiO_2$, 3% $Al_2O_3$, 13% $B_2O_3$, and 4% $Na_2O$ in mass %; thermal expansion coefficient: 3.2 ppm/° C.; refractive index (1,310 nm): 1.468; refractive index (1,550 nm): 1.465; beveled; cylinder of 2 mm in height×1.248 mmΦ in outer diameter)

Note that, a core portion of an optical fiber (single mode fiber (SMF)) had a refractive index of 1.452 at a wavelength of 1,310 nm and a refractive index of 1.449 at a wavelength of 1,550 nm.

<Sleeve A>

$ZrO_2$ (available from TOTO Ltd.; thermal expansion coefficient: 8.3 ppm/° C.; no slits; 1.6 mm in outer diameter×1.25 mm in inner diameter)

<Sleeve B>

$Li_2O$—$Al_2O_3$—$SiO_2$-based crystallized glass (crystallized glass sleeve, available from Nippon Electric Glass Co., Ltd.; thermal expansion coefficient: 2.7 ppm/° C.; no slits; 1.80 mm in outer diameter×1.25 mm in inner diameter)

<Heating by Electric Furnace>

The glass rod was inserted into an inner hole of the sleeve, and an end face of the sleeve on a base end side and an end face of the glass rod on a base end side were aligned to form an assembled body. The assembled body was placed in an electric furnace set to a heat treatment temperature shown in Table 1, and was maintained therein for a heat treatment time shown in Table 1. The glass rod was softened and taken out of the electric furnace, to thereby obtain a ferrule holding member of each of Examples 1 to 4. Note that, a difference in average thermal expansion coefficient between the glass rod (transparent body) and the sleeve at 30 to 380° C. was 3.2 ppm/° C. for Examples 1 to 3 and 0.5 ppm/° C. for Example 4.

TABLE 1

| | Heating by electric furnace | | | |
| --- | --- | --- | --- | --- |
| | Example 1 | Example 2 | Example 3 | Example 4 |
| Glass rod (transparent body) | (A) | (A) | (A) | (B) |
| Sleeve | (A) $ZrO_2$ | (A) $ZrO_2$ | (A) $ZrO_2$ | (B) Crystallized glass |
| Heat treatment temperature (° C.) | 720 | 710 | 700 | 650 |
| Heat treatment time (hours) | 1 | 2 | 2 | 2 |

TABLE 1-continued

| | Heating by electric furnace | | | |
|---|---|---|---|---|
| | Example 1 | Example 2 | Example 3 | Example 4 |
| Radius of curvature of end portion (mm) | 3.3 | 5.0 | 8.0 | 20 |
| Fixing strength (N) | >98 | >98 | >98 | >98 |
| Return loss (dB) | 43 | 43 | 43 | 49 |

<Laser>

The glass rod was inserted into an inner hole of the sleeve, and the end face of the sleeve on a base end side and the end face of the glass rod on a base end side were aligned to form an assembled body. The glass rod was irradiated with a laser beam from a tip opening portion of the sleeve under the conditions shown in Table 2 for softening and deforming the glass rod, to thereby obtain a ferrule holding member of each of Examples 5 and 6. Note that, a difference in average thermal expansion coefficient between the glass rod (transparent body) and the sleeve at 30 to 380° C. was 3.2 ppm/° C. for Example 5 and 2.4 ppm/° C. for Example 6.

TABLE 2

| | Laser (carbon dioxide laser: wavelength of 10.6 µm) | |
|---|---|---|
| | Example 5 | Example 6 |
| Glass rod (transparent body) | A | A |
| Sleeve | (A) $ZrO_2$ | (B) Crystallized glass |
| Output (W) | 10 | 10 |
| Heat treatment time (seconds) | 10 | 10 |
| Radius of curvature of end portion (mm) | 3.0 | 3.0 |
| Fixing strength (N) | >98 | >98 |
| Return loss (dB) | 43 | 43 |

Evaluation Method

<Radius of Curvature of End Portion>

The radius of curvature of the end portion was determined by using an interferometric microscope designed for measuring end face geometry (ACCIS, manufactured by Norland Products Inc.). The results revealed that: in each of Examples 1 to 4 involving heating by an electric furnace as shown in Table 1, the end portion (primary end face) of the transparent body had a radius of curvature of 3.0 mm to 20 mm; and in each of Examples 5 and 6 involving heating by laser as shown in Table 2, the end portion (primary face) of the transparent body had a radius of curvature of 3.0 mm. Each ferrule holding member had a preferable value for radius of curvature of an end portion.

<Fixing Strength>

As shown n FIG. 5, a distance D from a certain reference plane in the sleeve 4 to the transparent body 5 was measured in advance, and predetermined force was applied to the primary end face 5a of the transparent body 5 for a predetermined period of time (10 sec). Then, the distance D was measured again. Change in distance within a range of error indicated that the primary end face 5a and the sleeve 4 were fixed with a higher fixing strength than the applied force. The results of the experiment based on such technical idea revealed that the fixing strength exceeded 98 N in each of Examples 1 to 4 involving heating by an electric furnace as shown in Table 1 and Examples 5 and 6 involving heating by laser as shown in Table 2. Each ferrule holding member had a sufficient fixing strength.

<Return Loss>

A connector ferrule connected to an optical time domain reflectometer (OTDR MW9070B, manufactured by Anritsu Company) was inserted from an opening portion of the sleeve, and the connector ferrule was PC connected to the end portion of the transparent body, to thereby measure the return loss at a connected portion between the transparent body and the connector ferrule. A terminal portion (end portion opposite to the side having the connector ferrule inserted and subjected to PC connection) of the sample was polished to have a flat and inclined surface at 8° with respect to a normal direction of an optical axis such that reflection at the terminal portion could be ignored in principle. The results revealed that: in each of Examples 1 to 4 involving heating by an electric furnace as shown in Table 1, the return loss was 43 dB to 49 dB; and in each of Examples 5 and 6 involving heating by laser as shown in Table 2, the return loss was 43 dB. Each ferrule holding member had a preferable return loss.

TABLE 3

| | Transmission power (µW): optical wavelength of 1,310 nm | | | |
|---|---|---|---|---|
| Sample No. | Angle of inclination of flat surface 4° | Angle of inclination of flat surface 6° | Angle of inclination of flat surface 8° | Angle of inclination of flat surface 15° |
| 4-1 | 489 | 508 | 494 | 472 |
| 4-2 | 510 | 501 | 481 | 459 |
| 4-3 | 509 | 493 | 488 | 440 |
| 4-4 | 466 | 476 | 509 | 476 |
| 4-5 | 505 | 491 | 507 | 458 |
| 4-6 | 511 | 489 | 502 | 497 |

<Coupling Efficiency>

Table 3 shows the results of measurement of coupling efficiencies of six optical receptacles each formed by using the ferrule holding member of Example 4. Each optical receptacle has a secondary end face with a flat surface at an angle (angle of inclination of flat surface) of 4°, 6°, 8°, or 15° with respect to a plane perpendicular to the axis of the sleeve 4. The coupling efficiency is measured as described below. First, as shown in FIG. 6, the ferrule 6 having the optical fiber 7 attached was inserted into the optical receptacle 1, and was maintained under tension at about 1 kgf. Next, a laser diode 12 was driven under constant current by using a stabilized DC power supply 13. Light radiated from the laser diode 12 was condensed by a condenser lens 14, and was injected into the transparent body 5 from the second end face side. An optical axis was adjusted such that an optical coupling efficiency with the optical fiber 7 was maximized. Then, a value of optical power transmitted to the optical fiber 7 was measured by using an optical power meter 15, to thereby evaluate the coupling efficiency. Table 3 shows the measured values. As a comparison, light was directly coupled with the optical fiber 7 attached to the ferrule 6 without the optical receptacle 1 under the same conditions as described above. Then, a value (coupling efficiency) of optical power transmitted to the optical fiber 7 was measured by using the optical power meter 15, resulting in 512 µW. Table 3 reveals that the ferrule holding member of Example 4 having a flat surface at an angle of inclination of 4 to 15° maintained a high coupling efficiency.

Figure 1:
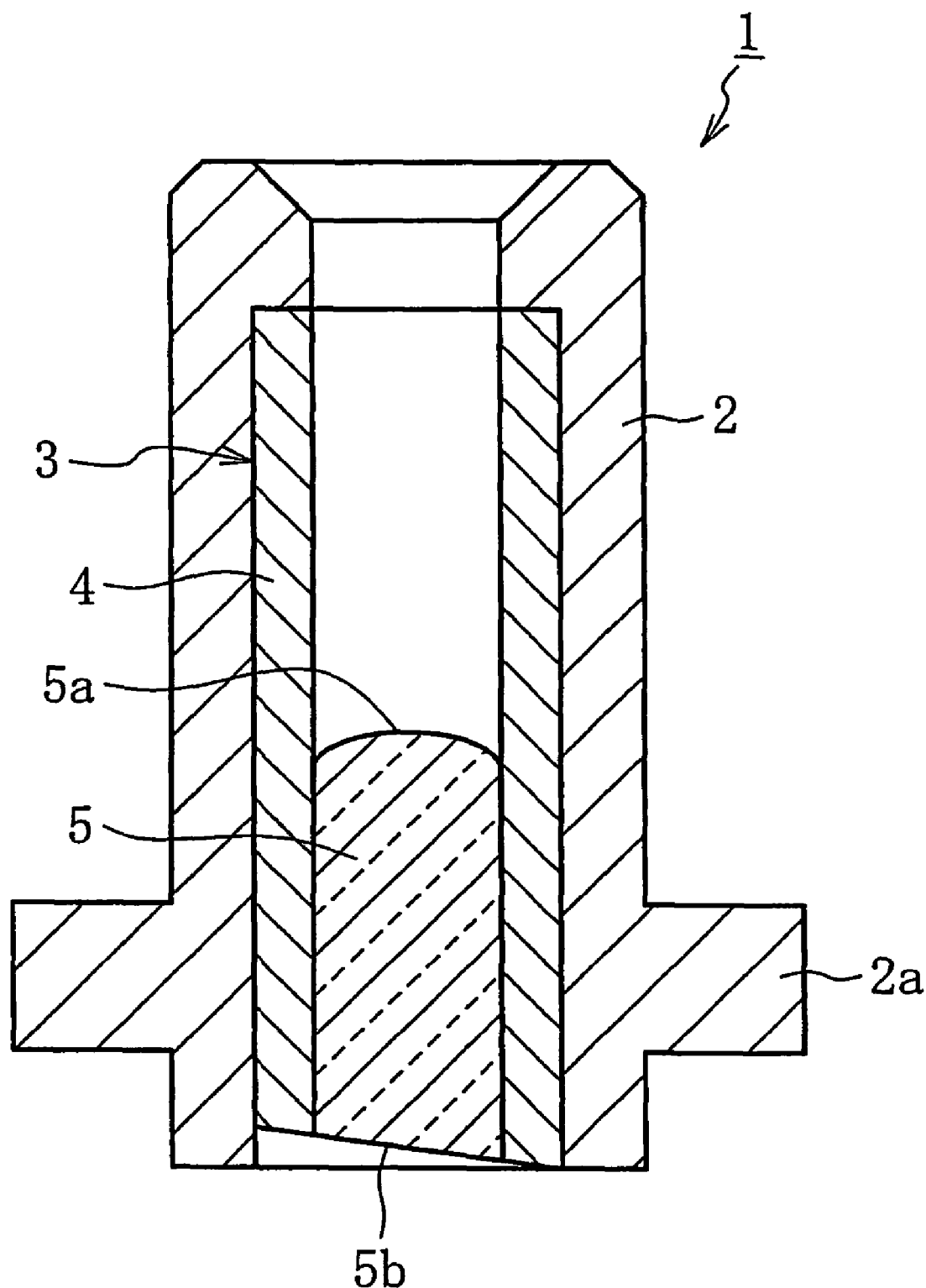
[FIG. 1] A longitudinal sectional front view showing an optical receptacle having attached thereto a ferrule holding member according to an embodiment of the present invention.
Figure 2:
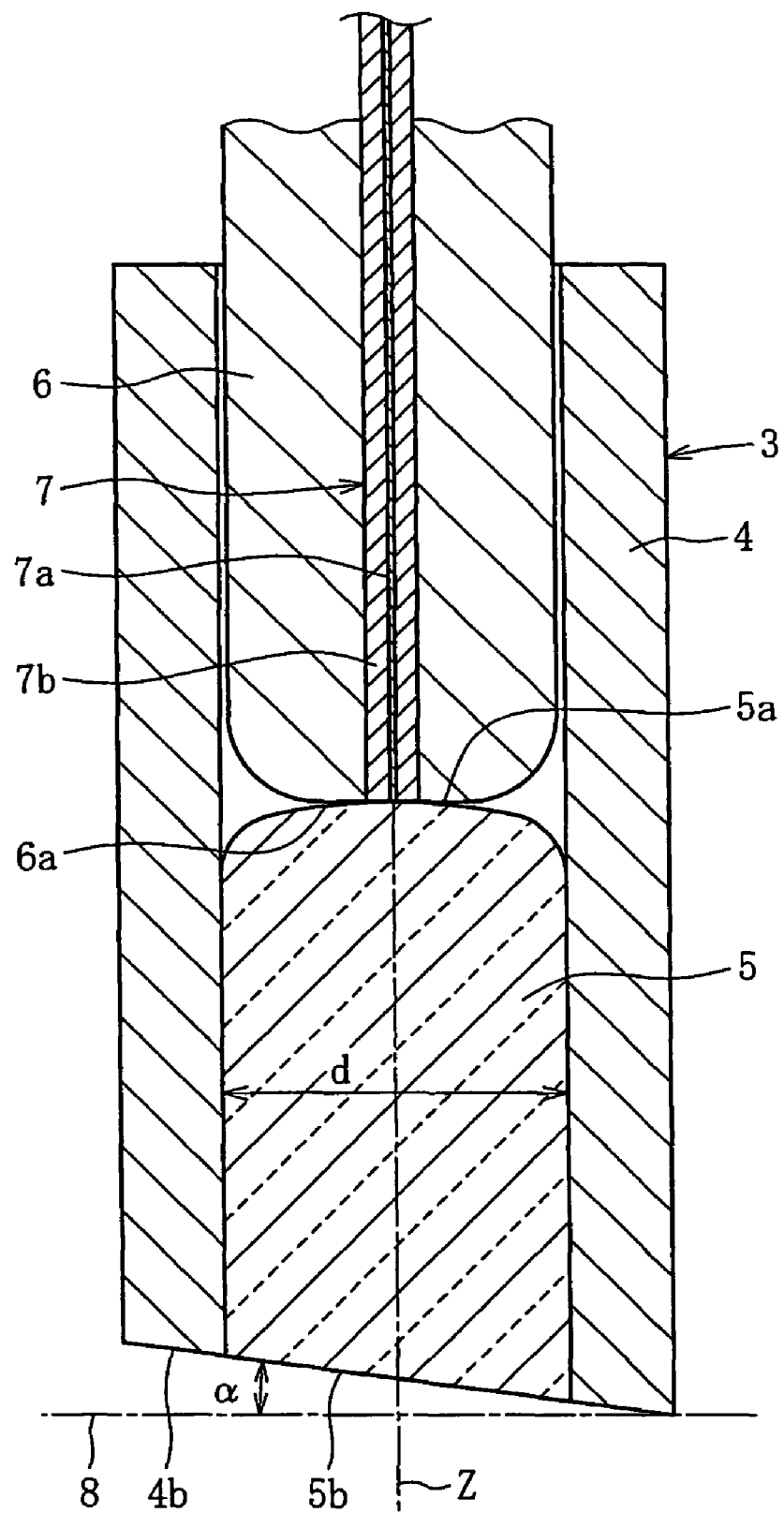
[FIG. 2] An enlarged longitudinal sectional front view of a main portion showing a state of a ferrule (plug ferrule) inserted into the ferrule holding member according to the embodiment of the present invention.
Figure 3:
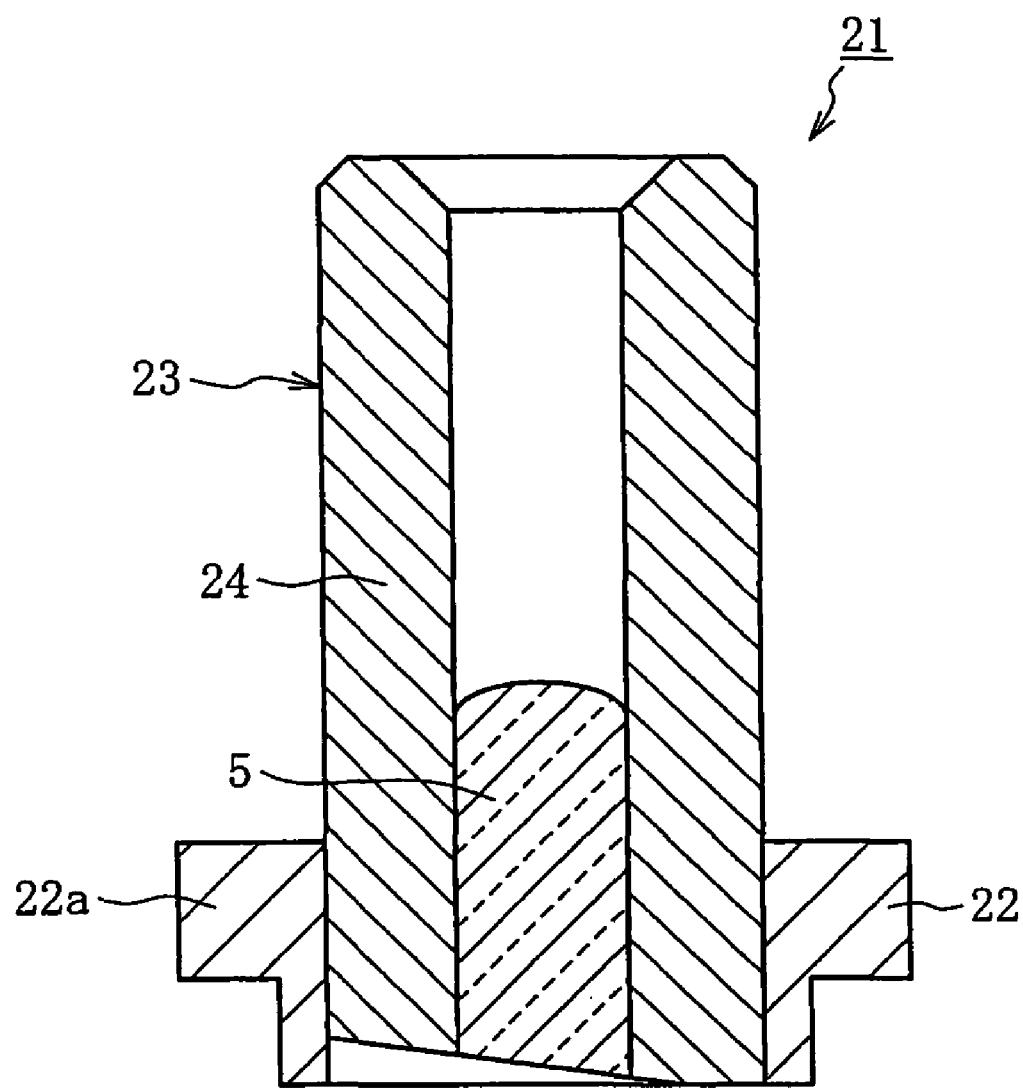
[FIG. 3] A longitudinal sectional front view of an optical receptacle having attached thereto a ferrule holding member according to another embodiment of the present invention.
Figure 4:
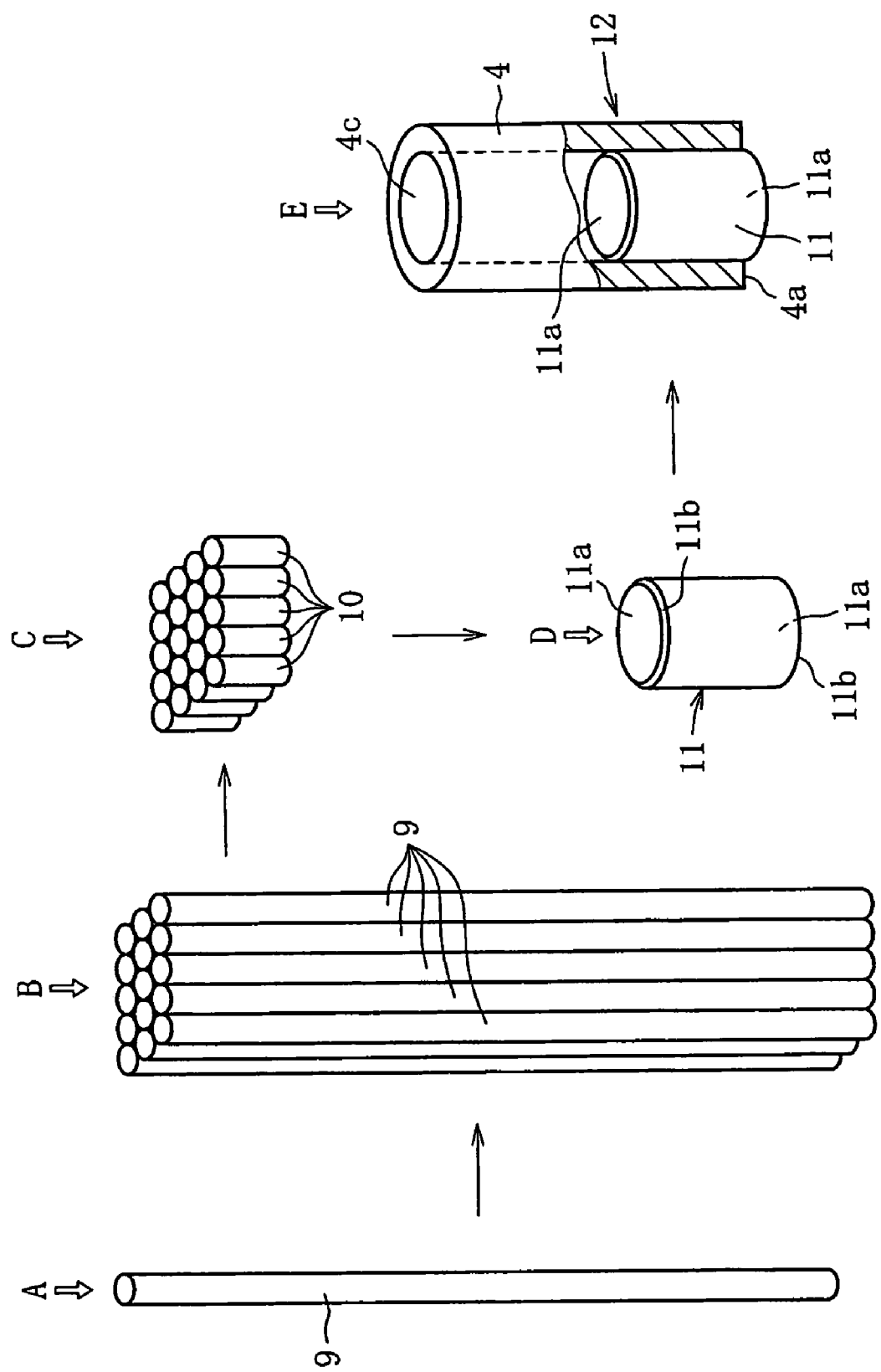
[FIG. 4] A schematic diagram showing a manufacturing status of a ferrule holding member according to an embodiment of the present invention.
Figure 5:
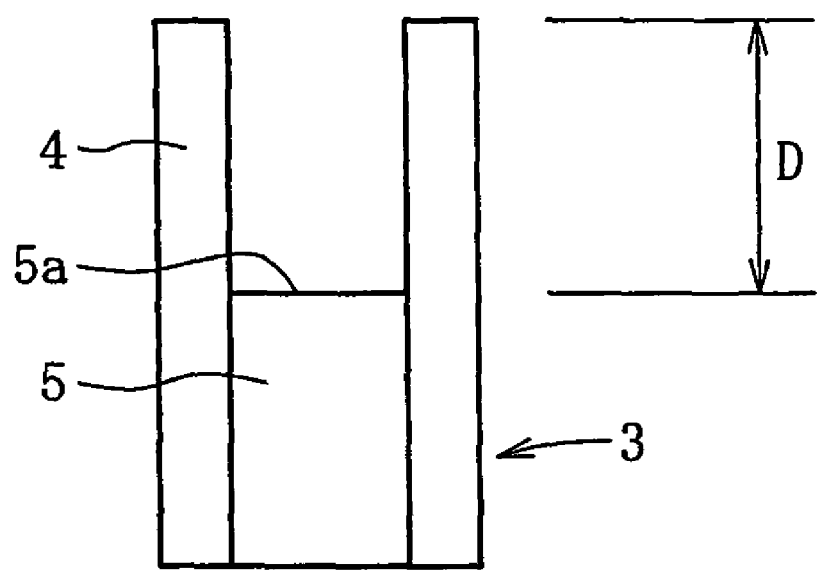
[FIG. 5] A schematic diagram illustrating the results of an experiment in Examples of the present invention.
Figure 6:
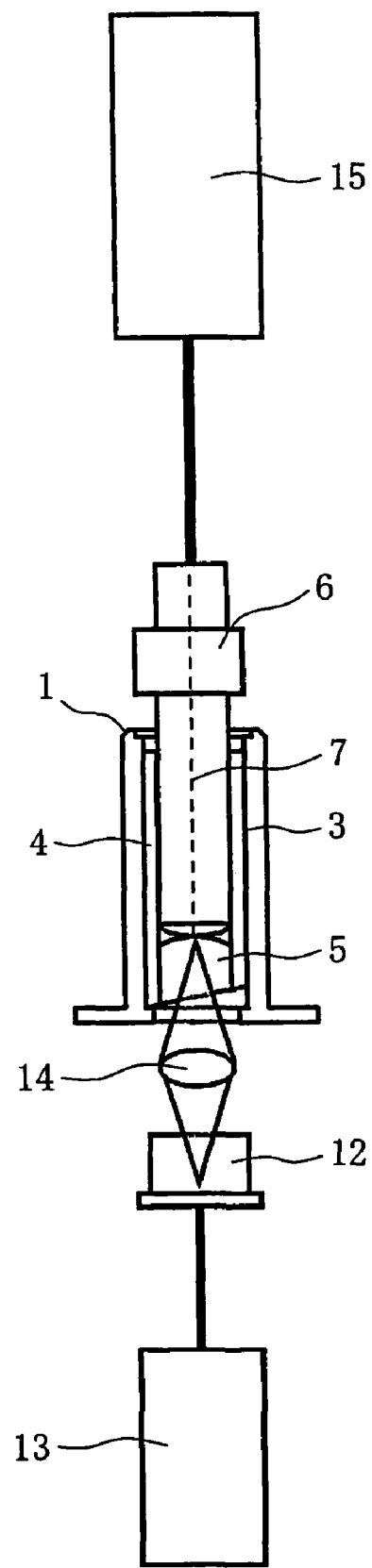
[FIG. 6] A schematic diagram illustrating a method of measuring a coupling efficiency in Examples of the present invention.

DESCRIPTION OF SYMBOLS 1, 21 Optical receptacle
2, 22 Holder
3, 23 Ferrule holding member (ferrule holding member for optical receptacle)
4, 24 Sleeve
5 Transparent body
5a Primary end face (convex spherical surface)
5b Secondary end face
6 Ferrule (plug ferrule)
6a End face of ferrule
7 Optical fiber
7a Core portion
8 Plane perpendicular to axis of sleeve
11 Glass rod
11b Beveling
12 Laser diode
13 Stabilized DC power supply
14 Condenser lens
15 Optical power meter
d Inner diameter of sleeve
Z Shaft axis of sleeve

The invention claimed is:

1. A ferrule holding member for an optical receptacle, comprising:
a sleeve having an inner hole for inserting a ferrule; and
a transparent body provided in the inner hole of the sleeve and having a primary end face for bringing into contact with an end face of the ferrule at a halfway position in an axial direction of the sleeve, characterized in that
the transparent body is formed of a single solid member and fixed directly to an inner surface of the sleeve, through heat treatment, with a fixing strength of 49 N or more, and
the primary end face of the transparent body has a convex curved surface obtained through heat treatment.

2. A ferrule holding member for an optical receptacle according to claim 1, characterized in that the primary end face of the transparent body has an unpolished surface.

3. A ferrule holding member for an optical receptacle according to claim 1, characterized in that a region with a radius of 75 μm or more centered around a shaft axis of the sleeve at the primary end face of the transparent body has a convex spherical surface.

4. A ferrule holding member for an optical receptacle according to claim 3, characterized in that a radius of curvature ρ of the convex spherical surface and an inner diameter d of the sleeve satisfy a relationship of ρ>d/2.

5. A ferrule holding member for an optical receptacle according to claim 3, characterized in that the convex spherical surface has a radius of curvature ρ of 3 to 50 mm.

6. A ferrule holding member for an optical receptacle according to claim 1, characterized in that a fixing strength between the sleeve and the transparent body is 49 N or more after the ferrule holding member for an optical receptacle is left standing in a high temperature and high humidity environment of 85° C. and 85% RH for 2,000 hours.

7. A ferrule holding member for an optical receptacle according to claim 1, characterized in that the transparent body and the sleeve are hermetically sealed.

8. A ferrule holding member for an optical receptacle according to claim 1, characterized in that the heat treatment is performed by means of arc discharge, laser, flame, or indirect heating with a heat treatment furnace or the like.

9. A ferrule holding member for an optical receptacle according to claim 1, characterized in that the ferrule holding member for an optical receptacle satisfies an expression of $-10 \log \{(nf-nb)^2/(nf+nb)^2\} \geq 37$, wherein nb represents a refractive index of the transparent body and of represents a refractive index of a core portion of an optical fiber attached to the inner hole of the ferrule.

10. A ferrule holding member for an optical receptacle according to claim 1, characterized in that a difference in average thermal expansion coefficient between the sleeve and the transparent body is 8 ppm/° C. or less at 30 to 380° C.

11. A ferrule holding member for an optical receptacle according to claim 1, characterized in that a difference in average thermal expansion coefficient between the sleeve and the transparent body is 1 ppm/° C. or less at 30 to 380° C.

12. A ferrule holding member for an optical receptacle according to claim 1, characterized in that the transparent body with a thickness of 1 mm has a light transmittance of 85% or more in an infrared region of a wavelength of 800 to 1,700 nm.

13. A ferrule holding member for an optical receptacle according to claim 1, characterized in that at least one of the transparent body and the sleeve each with a thickness of 1 mm partly or entirely has a light transmittance of 75% or more in an ultraviolet region of a wavelength of 300 to 450 nm.

14. A ferrule holding member for an optical receptacle according to claim 1, characterized in that the transparent body is formed of glass.

15. A ferrule holding member for an optical receptacle according to claim 1, characterized in that the transparent body is formed of borosilicate glass.

16. A ferrule holding member for an optical receptacle according to claim 15, characterized in that the borosilicate glass contains 65 to 85% $SiO_2$, 8 to 25% $B_2O_3$, 1.5 to 10% $Li_2O+Na_2O+K_2O$, 0 to 10% $Al_2O_3$, and 0 to 5% MgO+CaO+SrO+BaO+ZnO in mass %.

17. A ferrule holding member for an optical receptacle according to claim 1, characterized in that the transparent body has a flat surface inclined with respect to a plane perpendicular to an axis of the sleeve, the flat surface being formed on a secondary end face opposite to the primary end face.

18. A ferrule holding member for an optical receptacle according to claim 1, characterized in that the sleeve is formed of ceramics, crystallized glass, a metal, or a resin.

19. A ferrule holding member for an optical receptacle according to claim 1, characterized in that the sleeve has a slit formed.

20. An optical receptacle comprising the ferrule holding member for an optical receptacle according to claim 1.

21. A method of manufacturing a ferrule holding member for an optical receptacle including: a sleeve having an inner hole for inserting a ferrule; and a transparent body, formed of a single solid member, provided in the inner hole of the sleeve and having a primary end face for bringing into contact with an end face of the ferrule at a halfway position in an axial direction of the sleeve, comprising the step of forming the primary end face of the transparent body into a convex curved surface by: inserting a precursor of the transparent body into the inner hole of the sleeve; and softening the precursor of the transparent body by means of heat treatment, so that the transparent body is fixed directly to an inner surface of the sleeve with a fixing strength of 49 N or more.

22. A method of manufacturing a ferrule holding member for an optical receptacle according to claim 21, characterized in that the heat treatment is performed by means of arc discharge, laser, flame, or indirect heating with a heat treatment furnace or the like.

23. A method of manufacturing a ferrule holding member for an optical receptacle according to claim 21, characterized in that the precursor of the transparent body comprises a glass rod or a resin rod.

24. A method of manufacturing a ferrule holding member for an optical receptacle according to claim 23, characterized in that an end face of the glass rod or the resin rod is beveled.

* * * * *